United States Patent Office 3,006,722
Patented Oct. 31, 1961

3,006,722
PROCESS FOR THE PRODUCTION OF
METAL CHLORIDES
Charles Alexander Sutherland, Trail, British Columbia, Canada, assignor, by mesne assignments, to Nova Beaucage Mines Limited, Montreal, Quebec, Canada, a company
No Drawing. Filed May 13, 1958, Ser. No. 734,858
4 Claims. (Cl. 23—87)

This invention relates to the production of metal chlorides. It is particularly directed to an improved method of producing a chloride of a metal of the group consisting of niobium and tantalum from an ore or a concentrate of an ore of such a metal, such as pyrochlore, columbite and tantalite.

Niobium and tantalum metals can be produced by reduction of their pentachlorides and it is known that in this general process major operating difficulties arise from the presence of oxychlorides which may be formed concurrently with the formation of the pentachlorides. The oxychloride cannot be easily separated from the desired pentachloride; the oxychloride is difficult to collect and to handle, owing to its tendency to sublime; and, if the oxychloride is reduced, the resulting metal is contaminated with oxygen.

It is a primary object of this invention to provide a process whereby the pentachlorides of niobium and tantalum can be easily and economically obtained in a form substantially free from oxychloride and therefore suitable for the eventual production of ductile metal.

The method of this invention is described in detail as applied to the production of niobium pentachloride but it will be understood that, as the properties of niobium and tantalum are very similar, the method is also applicable to the production of tantalum pentachloride.

According to the process of the present invention, aluminum powder and carbon are mixed with a dry ore or concentrate which contains niobium in oxidized form, for example, niobium pentoxide or columbite. The resulting mixture is ignited, thereby forming a porous sinter which contains niobium carbide. The sinter is chlorinated to produce niobium pentachloride. The sinter produced by this improved process can be chlorinated very readily with chlorine gas at a relatively low temperature, for example, from about 400° C. to 500° C. The chlorination step results in the formation and evolution of niobium pentachloride and other volatile chlorides. This mixture of chlorides is substantially free from oxychloride. Niobium pentachloride is separated and recovered from this chloride mixture.

The reduction of niobium oxide with aluminum is known. However, the application of the thermite process to niobium ores or concentrates results in the formation of a dense, hard mass of slag with occluded metal. Pure niobium metal cannot easily be recovered from this product nor can such a mixture be satisfactorily chlorinated. Chlorination tests with such mixtures, even after pulverization, have shown that only part of the niobium can be recovered as the pentachloride and oxychloride. A substantial portion of the niobium remains unchlorinated in the residue.

It is also known that carbon can be reacted with niobium oxide at high temperature to produce niobium carbide and that niobium carbide can be chlorinated. However, it is difficult to obtain complete conversion of the metal oxides in the ore or concentrate to carbides owing to the endothermic nature of the reaction. Partially reduced oxide results in the formation of oxychloride in the chlorination step. Furthermore, the carbide produced is frequently powdery and consequently is not physically satisfactory as feed to a chlorination furnace.

In an attempt to produce suitable carbide material for chlorination, I have treated niobium concentrates by a two-stage process in which the concentrates were reacted with aluminum by the thermite process in a first stage, and the resultant product was pulverized and reacted in a second stage with carbon at elevated temperatures between 1600° C. and 2000° C. The product of this two-stage process was also unsatisfactory as feed to a chlorination operation.

In the method of the present invention, in which both aluminum and carbon are mixed with the niobium concentrate, the sintered product is porous and chlorinates easily and quickly to form chlorides without attendant formation of oxychloride. The recovery of niobium is high, about 90% of the niobium in the concentrate being recovered as niobium pentachloride in the chloride mixture.

In the operation of the process of the present invention, the niobium-containing raw material should be dry before being mixed with the aluminum powder and carbon. If water of hydration is associated with the concentrate, the water can be removed by heating the concentrate to about 800° C. to 1000° C.

The amount of aluminum powder that is mixed with the niobium concentrate should be sufficient to reduce to metal those metals which are present in the concentrate in oxidized form and whose oxides are reducible by aluminum. Gangue material such as alumina and lime need not, therefore, be considered in determining the amount of aluminum powder required for the reduction step. Silica is reduced to silicon by aluminum and therefore the amount of silica, if any, in the raw material must be taken into account in determining the amount of aluminum to be used. The reducible metal oxides usually include, in addition to niobium pentoxide, such oxides as $TiO_2$ and $Fe_2O_3$. The oxides may be present in the concentrate as equivalent compounds, e.g., niobates and titanates. There is no advantage in adding excess aluminum as the excess would not take part in the reduction reaction and would merely act as a diluent. Furthermore, any unreacted aluminum present in the sinter would cause difficulty in the subsequent chlorination step owing to the tendency of aluminum chloride to sublime. Unpolished aluminum powder gives satisfactory results in the ignition step.

The carbon which is mixed with the concentrate usually is added in excess of the amount theoretically required to form carbides of the niobium and other metals which are present in the concentrate and whose oxides are reducible by aluminum, such as titanium and iron. The amount of excess carbon will vary directly with the reducible metal oxide content of the concentrate, and may be as high as 200% excess with a high grade concentrate, for example, 80% $Nb_2O_5$, 9% $TiO_2$, 7% $Fe_2O_3$, and as low as 50% excess with a lower grade concentrate, for example, 30% $Nb_2O_5$, 15% $TiO_2$, 9% $Fe_2O_3$. Excess carbon is required to ensure complete reaction of all reduced metals to carbides and, with higher grade concentrates, to control the vigour of the reaction. A convenient form of carbon for the reaction is pulverized coke.

The dry concentrate, aluminum powder and carbon are mixed in a blender or other suitable mixing equipment to ensure uniform distribution of the various constituents throughout the mixture. The resultant mixture is then consolidated, or densified. This consolidation can be effected by compacting the dry mixture into pellets, or by moistening the mixture with water, or other suitable binding liquid, and pressing or extruding the moistened material into suitable shapes such as rods or briquettes.

If the mixture is moistened for consolidation, the consolidated material is dried at a relatively low temperature, for example, 100° C., to remove water.

The dry mixture, in the form of rods or briquettes, is charged to a furnace and heated to ignition temperature. Preferably, the charge is placed in a covered refractory crucible, such as a graphite crucible, which is heated externally. Heat is applied to raise the temperature of the charge to dull red heat, for example, from about 700° C. to about 900° C., whereupon the charge ignites and reaction within the charge proceeds spontaneously. The reaction is exothermic and heat is generated which increases the temperature of the charge to about 1600° C. and higher. During this heating and sintering operation, an inert gas cover is maintained over the mixture to prevent any reaction with the atmosphere.

The temperature attained in this ignition step should be at least about 1600° C. to ensure complete reduction of the reducible metal oxides and to effect complete conversion of the corresponding metals to their carbides. With lower temperatures, the resulting sinter is unsatisfactory as it does not chlorinate readily at the desired low chlorination temperatures of 400° C. to 500° C. Temperatures higher than about 1600° C. can be attained in the sintering step, and a satisfactory range is about 1600° C. to 2200° C. Temperatures above 2200° C. are not unsatisfactory but are not necessary. The reaction should not be too vigorous, of course, and therefore it is preferable to adjust the amount of excess carbon added to the initial mixture to control the sintering temperature within the cited range.

The generation of heat within the charge is caused by reaction between aluminum and the reducible metal oxides, or equivalent compounds, to form aluminum oxide and the metals. At the high temperatures generated in the reaction zone, the metals react with carbon to form carbides. The resultant product after ignition, therefore, comprises a sintered, porous mixture of alumina, metal carbides, excess carbon and gangue material present in the concentrates.

The grade of niobium bearing material to which the process can be applied can vary widely. Preferably, the reducible metal oxide content of the concentrate is sufficient to ensure that the heat of reaction with aluminum in the sintering step will heat the charge mixture to the required temperature, i.e., to at least 1600° C. If the reducible metal oxide content of the concentrate is too low for the reducing reaction to be self-sustaining, supplementary external heating can be supplied. However, in such cases it is preferable to arrange for the required supplementary heat by mixing with the concentrate sufficient high grade material, for example, $Nb_2O_5$ or $TiO_2$, or by adding to the concentrate an oxidizing agent such as $NaClO_3$ or $BaO_2$, to ensure that the reducing reaction within the mixture will itself generate sufficient heat to attain the required temperature.

The ignited product is in the form of a porous sinter. The sinter is allowed to cool and is then charged to a chlorinating furnace. The sinter usually retains approximately the size and shape of the original charge. This sintered product is well suited physically and chemically for feed to a chlorination furnace. The sinter is porous, presenting a large area for contact with chlorine; it is sufficiently strong to undergo chlorination without crumbling, but it is also sufficiently friable that it can be easily broken, if necessary, into sizes convenient for charging to the chlorinating zone.

The alumina in the sinter will absorb water from the atmosphere and hot carbides will react with oxygen and water vapour. It is necessary, therefore, to take precautions to ensure that the sinter will not be unduly exposed to the atmosphere. Such precautions are relatively simple and usually involve cooling the sinter under cover of an inert gas, for example, argon or nitrogen, and storing the sinter in closed containers until it is to be charged to the chlorination step of the process.

The cooled, dry sinter is charged to a chlorinating furnace or reactor where it is brought into contact with gaseous chlorine. The temperature of the charge during chlorination is maintained at from about 350° C. to 600° C., preferably about 400° C. to about 500° C. This temperature can be easily maintained by the heat generated by the chlorination reaction and can be controlled by heat exchange or by variations in the rate at which chlorine is passed to the furnace. Temperatures above 500° C. can be used but are not required. The minimum temperature of about 350° C. is necessary to ensure complete volatilization of the metal chlorides.

Volatile chlorides pass from the furnace and are collected by condensation. These chlorides normally include niobium pentachloride, titanium tetrachloride and ferric chloride. This mixed chloride product from the chlorination step is substantially free from oxychloride.

The chlorinating furnace and condenser are flushed with inert gas, e.g., argon, prior to the initiation of chlorination, to ensure that the equipment is free of oxygen and water vapour.

The niobium pentachloride can be recovered in pure form from the mixed chlorides by fractional distillation according to conventional practice. Similarly, any other desired chlorides, such as titanium tetrachloride, also can be recovered.

The residue which remains in the chlorination furnace after chlorination is dry and dense. It retains the form of the sinter charged to the furnace and can be easily withdrawn from the furnace.

*Example*

A portion of niobium concentrate (2120 gm.) which contained 30% $Nb_2O_5$, 14.4% $TiO_2$ and 10% $Fe_2O_3$, was calcined at about 800° C. for a period of about one hour to remove substantially all the water. It was then cooled, and mixed with 660 gm. of unpolished aluminum powder and 425 gm. of pulverized coke. The resulting mixture was moistened with water and shaped to form rods about 2 inches in diameter and about ten inches long.

The rods were dried at about 100° C. and then placed in a covered graphite crucible. The crucible was heated electrically to about 900° C., whereupon the charge in the crucible ignited spontaneously. The charge attained a maximum temperature above 1600° C. immediately after ignition. The reaction was completed in a period of about 30 seconds. The crucible was then removed from the furnace and allowed to cool. An inert gas cover was maintained over the contents of the crucible during heating and cooling by passing argon under the cover of the crucible.

The resulting sinter, after cooling, was stored in a covered container. The sinter weighed 3060 gm. The analysis of the sinter, expressed as oxides, was 20.8% $Nb_2O_5$, 10.0% $TiO_2$ and 7.0% $Fe_2O_3$. Actually, these metals occurred in the sinter as carbides.

The sinter charge of 3060 gm. was broken into pieces about the size of an inch cube and placed in the chlorinating furnace.

The chlorinating furnace was a heated Pyrex tube about 3 inches in diameter and about 5 feet long, arranged vertically. Chlorine gas was passed into the bottom of the furnace.

The furnace was heated initially to a temperature of about 400° C., but on the initiation of the chlorination reaction, the temperature was maintained by the heat of the reaction and controlled by varying the rate of flow of chlorine to the furnace.

The volatile chlorides formed in the chlorinating zone of the furnace passed from the top of the furnace to a condenser maintained at room temperature. A total of 1140 gm. of niobium pentachloride was collected in the condenser; some titanium tetrachloride and ferric chloride were also collected. This mixture of chlorides weighed 1880 gm. and was substantially free from oxychloride.

Substantially pure niobium pentachloride was recovered from the chloride mixture by fractional distillation. The recovery of niobium from concentrate to chlorine mixture was 87.5%.

The solid residue remaining in the furnace after chlorination weighed 2380 gm. Its analysis, expressed as oxide, was 3.3% $Nb_2O_5$, 2.1% $TiO_2$ and 4.2% $Fe_2O_3$.

The process of the present invention offers a number of advantages. It can be readily carried out in conventional equipment; all the required materials are readily available; and the chloride produced is consistently free from oxychloride. The carbide product of the sintering step is easy to handle; it is porous, but sufficiently strong to withstand handling and retain its desirable physical structure during chlorination.

It will be understood, of course, that modifications can be made in the preferred embodiment of the invention described herein without departing from the scope of the invention as defined by the appended claims.

What I claim as new and desire to protect by Letters Patent of the United States is:

1. The process for the production of the pentachloride of an element selected from the group consisting of niobium and tantalum from material which contains said element in oxide form which comprises the steps of compacting a substantially uniform mixture of said material, powdered aluminum and powdered carbon, into pieces of a predetermined shape, the aluminum being present in the compacted pieces in about the stoichiometric amount required for complete reduction to metal in elemental form of the oxides of those metals which are present in said compacted pieces in oxide form and whose oxides are reducible by aluminum, and the carbon being present in the compacted pieces within the range of from about 50% to about 200% in excess of the stoichiometric amount required to form carbides of those metals; igniting a charge of said compacted pieces in an inert atmosphere at a temperature of from about 1600° C. to about 2200° C. in a reaction zone wherein reaction throughout the charge to form carbides of those metals is complete within about 30 seconds from the time of ignition to form strong, porous, sintered pieces without appreciable change from their original shapes and which contain said element as a carbide thereof, reacting so-sintered pieces with chlorine in an atmosphere substantially free from oxygen and water vapour to convert the carbide of said element to the pentachloride thereof, and separating and recovering the said pentachloride from the product of the chlorination reaction.

2. The process according to claim 1 in which a material which contains an element selected from the group consisting of niobium and tantalum in oxide form is calcined at a temperature of from about 800° C. to about 1000° C. prior to the compacting step.

3. The process according to claim 1 in which the compacted pieces are dried at a temperature of about 100° C. prior to ignition.

4. The process according to claim 1 in which the chlorination step is conducted at a temperature within the range of from about 350° C. to about 600° C.

References Cited in the file of this patent

UNITED STATES PATENTS

| | | |
|---|---|---|
| 1,418,528 | Burgess | June 6, 1922 |
| 2,124,509 | McKenna | July 19, 1938 |
| 2,886,454 | Todd | May 12, 1959 |

FOREIGN PATENTS

| | | |
|---|---|---|
| 541,382 | Italy | Mar. 28, 1956 |

OTHER REFERENCES

Schwarzkopf: "Refractory Hard Metals," pages 109, 116, 117 (1953), The MacMillan Co., N.Y.